(12) United States Patent
Armbrust et al.

(10) Patent No.: US 8,137,430 B2
(45) Date of Patent: Mar. 20, 2012

(54) CALCIUM FORMATE FERTILISER

(75) Inventors: Ralph Armbrust, Dormagen (DE);
Peter Baur, Schondorf (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 12/445,629

(22) PCT Filed: Nov. 12, 2007

(86) PCT No.: PCT/EP2007/062218
§ 371 (c)(1),
(2), (4) Date: Aug. 25, 2010

(87) PCT Pub. No.: WO2008/058936
PCT Pub. Date: May 22, 2008

(65) Prior Publication Data
US 2010/0313620 A1    Dec. 16, 2010

(30) Foreign Application Priority Data
Nov. 14, 2006   (DE) .......................... 10 2006 053 539

(51) Int. Cl.
*C05D 9/02*    (2006.01)

(52) U.S. Cl. .............................. 71/27; 71/64.08; 71/64.1
(58) Field of Classification Search ................ 71/11–30, 71/64.08, 64.1
See application file for complete search history.

(56) References Cited

U.S. PATENT DOCUMENTS

| 5,720,793 | A  | * | 2/1998  | Kato et al. ..................... 71/16 |
| 5,922,101 | A  | * | 7/1999  | Urano et al. ..................... 71/27 |
| 6,206,946 | B1 | * | 3/2001  | Hayashi et al. .................. 71/31 |
| 6,497,743 | B2 |   | 12/2002 | Hayashi et al. .................. 71/27 |
| 2002/0005053 | A1 | * | 1/2002 | Hayashi et al. .................. 71/11 |
| 2002/0100302 | A1 | * | 8/2002 | Hayashi et al. .................. 71/27 |

FOREIGN PATENT DOCUMENTS

| EP | 0 837 044  | 4/1998  |
| EP | 0 860 410  | 1/2005  |
| JP | 59 137384  | 8/1984  |
| JP | 05 139872  | 6/1993  |
| JP | 08 149924  | 6/1996  |
| JP | 09 263477  | 10/1997 |
| JP | 2001 192310 | 7/2001 |

* cited by examiner

*Primary Examiner* — Wayne Langel
(74) *Attorney, Agent, or Firm* — Michael A. Miller

(57) ABSTRACT

The invention relates to a method for producing a formulation containing calcium formiate, to the formulation itself, and to the use thereof for producing a product, and the use thereof as a fertilizer.

16 Claims, No Drawings

CALCIUM FORMATE FERTILISER

The invention relates to a process for the preparation of a formulation comprising calcium formate, to the formulation itself, and to its use for the preparation of a composition and its use as a fertilizer.

The element calcium is a macronutrient for all plants. This is why calcium salts are frequently employed as fertilizers in plant production, to be precise both in soil fertilization and in foliar fertilization. The foliar fertilization with calcium plays an important role in particular in some horticultural crops. Thus, it is possible, for example, to suppress the phenomenon of bitter pit in apple fruits. This calcium deficiency disease causes great losses and/or a drop in fruit quality, in particular during the storage phase. Blossom-end rot in tomatoes, cucumbers and peppers can also be prevented by foliar fertilization with calcium. In strawberries and other types of fruit, better fruit formation is observed. In general, foliar calcium fertilizers are currently employed in vegetable production for improving the growth properties.

While calcium compounds which are sparingly soluble (limestone, calcium sulfate) are frequently employed for the soil fertilization with calcium, calcium salts which are readily soluble in water must be used for the purposes of foliar fertilization. Calcium chloride or calcium nitrate are frequently used.

However, it is known that calcium chloride in elevated concentration damages the leaves. This is the case especially during hot summer weather. Calcium nitrate may lead to an undesirable nitrogen fertilizer effect via the nitrate content, by which growth is unduly stimulated. In some plants, moreover, the fruit only develops insufficient color. Moreover, nitrate ions pollute the groundwater.

Here, calcium formate, which does not show the above-described undesirable side effects, has a clear advantage. Calcium formate is soluble in water up to a concentration of approximately 13.8%. It does not contain any potentially damaging chloride or nitrate ions. Formate is a constituent of the soluble acids for example in apple fruits.

It is known from JP 59-137384-A to use calcium formate solutions as foliar fertilizers. JP 05-139872-A describes a synergistic effect when using solutions of calcium formate and calcium propionate as foliar fertilizers. EP 860 410 A, EP 934 917 A and EP 1 312 594 A disclose that additives in foliar fertilizers can enhance the uptake of nutrients such as, for example, calcium even further.

However, it is a disadvantage of the described calcium-formate-containing foliar fertilizers that they either only exist in a form which is difficult to handle and which does not allow uniform metering when preparing the spray mixture, or as aqueous solutions they require a very great volume, which prevents an economical application in the field.

There have now been found particularly advantageous formulations which allow precise metering and which comprise calcium formate, water and at least one thickener.

For example, the formulations according to the invention have a calcium formate content of from 15 to 60% by weight, preferably of from 30 to 50% by weight.

Furthermore, the formulations according to the invention have a thickener content of for example, from 0.05 to 2.5% by weight, preferably from 0.1 to 1.0% by weight.

Examples of suitable thickeners are alginic acid, sodium alginate, potassium alginate, ammonium alginate, calcium alginate, propylene glycol alginate, agar agar, carrageenan, carob bean gum, pectin, guar gum, tragacanth, gum arabic, xanthan gum, diutan gum, welan gum, karaya gum, tara gum, gellan, starch. However, it is also possible to employ cellulose derivatives such as cellulose, microcrystalline cellulose, cellulose powder, methylcellulose, hydroxypropylcellulose, hydroxypropylmethylcellulose, methylethylcellulose, carboxymethylcellulose and enzymatically hydrolyzed carboxymethylcellulose, polyacrylates or any desired mixtures of the abovementioned thickeners. Preferred thickeners are xanthan gum, diutan gum and welan gum.

Depending on the choice of the thickener, it may be advantageous that the formulation furthermore comprises one or more preservatives in order to prevent the biodegradation of the thickener upon prolonged storage times.

Examples of preservatives which can be used are preservatives from the group of the isothiazolinones, benzothiazolinones, formaldehyde-releasing substances, or substances such as 2-bromo-2-nitro-1,3-propanediol (bronopol), 2-phenylphenol (OPP), tetramethylthiuram disulfide, bis(dimethylthiocarbamoyl)disulfide (thiram), ascorbic acid, propionic acid, sodium sorbate, potassium sorbate, calcium sorbate, benzoic acid, sodium benzoate, potassium benzoate, calcium benzoate, ethyl p-hydroxybenzoate (PHB ester), sodium ethyl p-hydroxybenzoate (PHB ethyl ester, sodium salt), propyl p-hydroxybenzoate (PHB propyl ester), sodium propyl p-hydroxybenzoate (PHB propyl ester, sodium salt), methyl p-hydroxybenzoate (PHB methyl ester), sodium methyl p-hydroxybenzoate (PHB methyl ester, sodium salt), sodium sulfite, sodium hydrogen sulfite (sodium bisulfite), sodium metabisulfite (sodium disulfite), potassium metabisulfite, potassium sulfite, calcium sulfite, calcium hydrogen sulfite, potassium hydrogen sulfite (potassium bisulfite), biphenyl (diphenyl), sodium orthophenylphenol, thiabendazole, nisin, natamycin, hexamethylenetetramine, potassium nitrite and sodium nitrite, and their derivatives, or any mixtures of the abovementioned preservatives.

Preferred preservatives are selected from the group of the isothiazolinones, benzothiazolinones, ascorbic acid and propionic acid.

The preferred concentration of the preservatives is usually less than 1.0% by weight.

It may be advantageous that the formulation furthermore comprises one or more surfactants in order to improve the wetting of the leaf with the fertilizer and to prolong the binding of water, which brings about an increased absorbability of the calcium formate.

Examples of suitable surfactants are sorbitol, sorbitol syrup, mannitol, glycerol, polyoxyethylene (40) stearate, polyoxyethylene sorbitan monolaurate (polysorbate 20), polyoxyethylene sorbitan monooleate (polysorbate 80), polyoxyethylene sorbitan monopalmitate (polysorbate 40), polyoxyethylene sorbitan monostearate (polysorbate 60), polyoxyethylene sorbitan tristearate (polysorbate 65), ammonium phosphatides, sucrose acetate isobutyrate, glycerol ester from root resin, sodium salts, potassium salts and calcium salts of fatty acids, magnesium salts of fatty acids, fatty acid mono- and diglycerides, acetic esters of fatty acid mono- and diglycerides, lactic esters of fatty acid mono- and diglycerides, citric esters of fatty acid mono- and diglycerides, tartaric esters of fatty acid mono- and diglycerides, mono- and diacetyl tartaric esters of fatty acid mono- and diglycerides, mixed acetic and tartaric esters of fatty acid mono- and diglycerides, fatty acid sugar esters, sugar glycerides, fatty acid polyglycerol esters, polyglycerol polyricinoleate, fatty acid propylene glycol esters, thermooxidized soya oil with fatty acid mono- and diglycerides, sodium stearoyl-2 lactylate, calcium stearoyl-2 lactylate, stearyl tartrate, sorbitan monostearate, sorbitan tristearate, sorbitan monolaurate, sorbitan monooleate, sorbitan monopalmitate, alkylphenol ether sulfates, phosphate esters, sulfosuccinates, alcohol alkoxylates, alkylglucosides, castor oil ethoxylates, cocoamine ethoxylates and alkylphenol ethoxylates, or any mixtures of the abovementioned surfactants.

Preferred surfactants are alcohol alkoxylates. It is especially preferred to employ 2-ethylhexanol propylene ethylene glycol ether (CAS number 64366-70-7, product name Emulgator HOT 5902), if appropriate in combination with polypropylene glycol.

It is preferred to employ the surfactants in a concentration of from 1 to 10% by weight in the formulation.

The reaction of calcium formate in aqueous solution is weakly alkaline. It may therefore be advantageous that the formulation furthermore comprises one or more acidifying agents in order to adjust a lower pH. Acidifying agents which are possible are organic or inorganic acids. These are, for example, formic acid, acetic acid, lactic acid, boric acid, malic acid, fumaric acid.

It may be advantageous that the formulation futhermore comprises one or more dispersants. This has a positive effect on the stability and fluid dynamics of the calcium formate suspension. Dispersants which are possible are, for example, salts of polyaspartic acid such as, for example, the sodium salt of polyaspartic acid (CAS number 181828-06-8, trade name Baypure® DS 100).

It may be advantageous that the formulation furthermore comprises one or more trace element compound, preferably those which are water soluble.

Trace element compounds are, for example, compounds of boron, manganese, zinc, iron, copper, cobalt and molybdenum. The trace element compound content in the formulation may be, in the case of boron, for example at least 0.010% by weight, in the case of cobalt for example at least 0.002% by weight, in the case of copper for example at least 0.002% by weight, in the case of iron for example at least 0.020% by weight, in the case of manganese for example at least 0.010% by weight, in the case of molybdenum for example at least 0.001% by weight and in the case of zinc for example at least 0.002% by weight. Especially suitable trace element compounds are those which are water-soluble in the abovementioned concentrations.

If the trace element compounds used are boron compounds, then the preferred weight ratio of calcium to boron is, in mathematical terms in relation to the elements, more than 40:1, especially preferably more than 100:1.

It is preferred to use a combination of trace element compounds of boron, of manganese and of zinc. The preferred weight ratios, in mathematical terms in relation to the elements, are then in the case of boron to manganese in the range of from 1:0.3 to 1:30 and in the case of zinc to manganese in the range of from 1:0.5 to 1:50.

Weight ratios of boron to manganese of from 1:1 to 1:10 and of zinc to manganese of from 1:2 to 1:20 are especially preferred.

In, a further embodiment, the trace element compounds may he chelated by a chelating agent. This increases the availability of the trace element for the foliar fertilization.

Examples of suitable chelating agents for the trace element compound are ethylenediaminetetraacetic acid (EDTA), diethylenetriaminepentaacetic acid (DTPA), ethylenediaminedi(o-hydroxyphenyl)acetic acid (EDDHA), hydroxy-2-ethylenediaminetriacetic acid (HEEDTA), ethylenediaminedi(o-hydroxy-p-methylphenyl)acetic acid (EDDHMA), ethylenediaminedi(5-carboxy-2-hydroxyphenyl)acetic acid (EDDCHA) and iminodisuccinic acid, or the sodium, potassium, ammonium salts of these acids.

Salts of iminodisuccinic acid are preferred.

In addition, the formulation may comprise additives in order to increase the overall performance. Such additives for increasing the overall performance are, for example, substances such as urea, ammonium thiosulfate, protein hydrolyzate, lignosulfonic acid or lignosulfonates.

To prepare the formulation, a procedure is followed in which, for example, the constituents are processed while supplying mixing energy. This usually and preferably gives the formulation in the form of a suspension.

The formulation according to the invention can then be diluted with water to give a composition which can be used as fertilizer, preferably as foliar fertilizer. The composition is, then, preferably employed by spraying.

The composition according to the invention may by way of example and with preference comprise a calcium concentration of from 0.06 to 0.6% by weight.

The advantage of the formulations according to the invention is that they are storage-stable, can be handled readily and permit the preparation of compositions with superior properties with regard to the calcium utilization in the plant.

EXAMPLES

Examples 1a to 7a

Mixing the respective constituents gave the formulations shown in Table 1, the figures relating in each case to % by weight.

TABLE 1

| Constituent | Example |  |  |  |  |  |  |
|---|---|---|---|---|---|---|---|
|  | 1a* | 2a** | 3a | 4a | 5a | 6a | 7a |
| Calcium formate | 40.00 | 10.00 | 45.00 | 43.85 | 45.00 | 43.85 | — |
| Sodium alpha-heptonate | 10.00 | — | — | — | — | — | — |
| Sodium gluconate | — | 0.50 | — | — | — | — | — |
| Polyglycerol monooleate | 20.00 | — | — | — | — | — | — |
| Glycerol monooleate | — | 1.00 | — | — | — | — | — |
| POE (20) sorbitan laurate | — | 4.00 | — | — | — | — | — |
| Aminosol[1] | — | — | 7.00 | 2.00 | — | 2.00 | — |
| Ammonium thiosulfate | — | — | — | 1.00 | — | 1.00 | — |
| Calcium lignosulfonate (5% Ca) | — | — | — | 7.00 | — | 7.00 | — |
| Urea | — | — | — | — | 5.00 | — | — |
| Boric acid | — | — | — | — | — | 0.30 | — |
| Zinc sulfate heptahydrate | — | — | — | — | — | 0.10 | — |
| Manganese sulfate monohydrate | — | — | — | — | — | 0.60 | — |
| Baypure CX 140/44[2] | — | — | — | — | — | 3.00 | — |
| Emulgator HOT 5902[3] | — | — | — | — | 1.00 | — | — |
| Polypropylene glycol[4] | — | — | — | — | 3.00 | — | — |
| Xanthan | — | — | 0.31 | 0.31 | 0.31 | 0.31 | — |
| Preventol D7[5] | — | — | 0.09 | 0.09 | 0.09 | 0.09 | — |
| Distilled water | 30.00 | 84.5 | 47.60 | 45.75 | 45.60 | 41.75 | 100.00 |

*Example 6 from EP 860 410 A;
**Example 8 from EP 934 917 A
[1] Aminosol® = nitrogen fertilizer Lebosol, based on protein hydrolyzate (9% N).
[2] Baypure CX 140/44® from Lanxess = tris-ammonium salt of iminodisuccinic acid (44% strength solution in water), chelating agent for trace elements.
[3] Emulgator HOT 5902® from Lanxess, HLB value = 4.7 (calculated)
[4] Mean molar mass 600
[5] Preventol D7® from Lanxess = preservative based on isothiazolinones The consistency of the formulations is shown in Table 2:

TABLE 2

| | Example | | | | | | |
|---|---|---|---|---|---|---|---|
| | 1a | 2a | 3a | 4a | 5a | 6a | 7a |
| Calcium content in % by weight | 12.4 | 3.1 | 13.9 | 13.9 | 13.9 | 13.9 | 0 |
| Appearance | Viscous paste (not flowable) | Solution | Stable suspension | | | | — |

Examples 1b to 7b

Dilute spray solutions are prepared shortly before use by mixing the formulations of Examples 1a to 7a. To this end, the following formulations were prepared:
  Example 1 (comparative)=11.25 g of paste dissolved in 988.75 g of distilled water,
  Example 2 (comparative)=45 g of solution dissolved in 955 g of distilled water,
  Example 3=10 g of suspension dissolved in 990 g of distilled water,
  Example 4=10 g of suspension dissolved in 990 g of distilled water,
  Example 5=10 g of suspension dissolved in 990 g of distilled water,
  Example 6=10 g of suspension dissolved in 990 g of distilled water,
  Example 7 (blank experiment)=distilled water was used as the spray substance.

The compositions of the dilute spray solutions are shown in Table 3 herein below:

TABLE 3

| | Example | | | | | | |
|---|---|---|---|---|---|---|---|
| | 1b | 2b | 3b | 4b | 5b | 6b | 7b |
| g formulation per kg aqueous spray solution | 11.25 | 45 | 10 | 10 | 10 | 10 | 0 |
| Ca content [g/kg] | 1.39 | 1.39 | 1.39 | 1.39 | 1.39 | 1.39 | 0 |

Examples 1c to 7c

Using the freshly prepared spray solutions of Examples 1b to 7b, the fertilization experiments 1c to 7c were carried out on tomato plants.

To this end, pre-grown tomato plants cv. "Harzfeuer" were used, which
  were originally planted singly at a depth of approx. 4 to 5 cm in topsoil and potting compost in plastic pots with an internal diameter of 22 cm and a height of 40 cm, fertilized with 5.0 g of tomato fertilizer and subsequently puddled in with distilled water
  and had in each case approximately the same size and a stem height of approximately 12 cm when the experiment was carried out.

Topsoil and potting compost type "TOPF" from Einheitserde Werkverband were used for planting. The potting compost contained NPK fertilizer and had a pH of 5.5 to 6.5 at ambient temperature, which was adjusted by adding approximately 5 kg of calcium carbonate per m$^3$ of potting compost. The topsoil was freed from stones and roots. Topsoil and potting compost were mixed in a volume ratio of 1:1.

In principle, the tomatoes are when required, watered with distilled water and fertilized (soil fertilizer). The tomato fertilizer used was "GRÜNER JAN" from Thomas Philipps GmbH & Co. KG:

9% N (total nitrogen), 6% P$_2$O$_5$ (total phosphate), 10% K$_2$O (water-soluble potassium oxide), 3% MgO magnesium oxide, 35% dry matter (cacao husks, vinasse/molasses, potassium and magnesium salts, basic rock meal, urea, crude phosphate)

By way of universal liquid fertilizer, fertilizer of the "Gartenkrone" brand was used:

7% N (total nitrogen), 3% P$_2$O$_5$ (total phosphate), 6% K$_2$O (water-soluble potassium oxide)

The tomato plants were treated in accordance with the following regime:

| | |
|---|---|
| Day 0 | Tomatoes planted, location greenhouse |
| Day 15 | Calcium treatment 1, location greenhouse |
| Day 23 | Calcium treatment 2, location greenhouse |
| Day 31 | Calcium treatment 3, location greenhouse. Each pot fertilized with 6.0 g of tomato fertilizer. |
| Day 36 | Calcium treatment 4, tomatoes now in the open, with rain protection, fertilized with universal liquid fertilizer (1 capful per 10 l of water). |
| Day 43 | Calcium treatment 5 |
| Day 56 | Calcium treatment 6 |
| Day 62 | Each pot fertilized with 4 g of tomato fertilizer. |
| Day 72 | Each pot fertilized with 4 g of tomato fertilizer, calcium treatment 7 |
| Day 78 | Calcium treatment 8 |
| Day 85 | Calcium treatment 9 |
| Day 93 | Each pot fertilized with 4 g of tomato fertilizer, calcium treatment 10 |
| Day 99 | Calcium treatment 11 |
| Day 106 | Harvest. Three tomatoes sampled from each plant. For drying, in each case two equally thick slices (without the green hilum) were cut out. All tomatoes were equal in size and stage of maturity. |

The term calcium treatment here comprises the treatment of the tomato plants with the spray solutions, in each case freshly made, of Examples 1c to 7c. A pressure spray flask (Glòria prima 5) was used for spraying the plants. Before use, and after each change, the pressure spray flask is cleaned thoroughly with distilled water. The plants are sprayed with the spray solutions to runoff point.

After harvesting, the dried tomato slices were analyzed, and the results are shown in Table 4:

TABLE 4

| | Example | | | | | | |
|---|---|---|---|---|---|---|---|
| | 1c | 2c | 3c | 4c | 5c | 6c | 7c |
| Ca content [m/kg] | 670 | 650 | 800 | 800 | 820 | 880 | 550 |
| Zn content [mg/kg] | n.d. | n.d. | n.d. | n.d. | n.d. | 19 | 17 |
| Mn content [mg/kg] | n.d. | n.d. | n.d. | n.d. | n.d. | 9.7 | 6.5 |
| B content [mg/kg] | n.d. | n.d. | n.d. | n.d. | n.d. | 9 | 8 |

We claim:

1. A formulation comprising calcium formate, water and at least one thickener, wherein the calcium formate content is from 15 to 60% by, weight.

2. The formulation as claimed in claim 1, characterized in that the thickener content is from 0.05 to 2.5% by weight.

3. The formulation as claimed in claim 1, characterized in that the thickeners used are selected from the group consisting alginic acid, sodium alginate, potassium alginate, ammonium alginate, calcium alginate, propylene glycol alginate, agar agar, carrageenan, carob bean gum, pectin, guar gum, tragacanth, gum arabic, xanthan gum, diutan gum, welan gum, karaya gum, tara gum, gellan, starch, cellulose, microcrystalline cellulose, cellulose powder, methylcellulose, hydroxypropylcellulose, hydroxypropylmethylcellulose, methyl-ethyl-cellulose, carboxymethylcellulose, enzymatically hydrolyzed carboxymethylcellulose, polyacrylates and mixtures thereof.

4. The formulation as claimed in claim 1, which furthermore comprises one or more preservatives.

5. The formulation as claimed in claim 4, characterized in that the preservatives are selected from the group consisting of isothiazolinones, benzothiazolinones, formaldehyde-releasing substances, 2-bromo-2-nitro-1,3-propanediol (bronopol), 2-phenylphenol (OPP), tetramethylthiuram disulfide, bis(dimethylthiocarbamoyl)disulfide (thiram), ascorbic acid, propionic acid, sodium sorbate, potassium sorbate, calcium sorbate, benzoic acid, sodium benzoate, potassium benzoate, calcium benzoate, ethyl p-hydroxybenzoate (PHB ester), sodium ethyl p-hydroxybenzoate (PHB ethyl ester, sodium salt), propyl p-hydroxybenzoate (PHB propyl ester), sodium propyl p-hydroxybenzoate (PHB propyl ester, sodium salt), methyl p-hydroxybenzoate (PHB methyl ester), sodium methyl p-hydroxybenzoate (PHB methyl ester, sodium salt), sodium sulfite, sodium hydrogen sulfite (sodium bisulfite), sodium metabisulfite (sodium disulfite), potassium metabisulfite, potassium sulfite, calcium sulfite, calcium hydrogen sulfite, potassium hydrogen sulfite (potassium bisulfite), biphenyl (diphenyl), sodium orthophenylphenol, thiabendazole, nisin, natamycin, hexamethyl-enetetramine, potassium nitrite, sodium nitrite, derivatives thereof and mixtures thereof.

6. The formulation as claimed in claim 1, which furthermore comprises one or more surfactants.

7. The formulation as claimed in claim 1, which furthermore comprises one or more acidifying agents.

8. The formulation as claimed in claim 1, which furthermore comprises one or more dispersants.

9. The formulation as claimed in claim 1, which further comprises one or more trace element compounds.

10. The formulation as claimed in claim 9, characterized in that the trace element compounds are at least partly chelated by a chelating agent.

11. The formulation as claimed in claim 1, which further comprises one or more additives.

12. A process for the preparation of a formulation as claimed in claim 1 comprising mixing the calcium formate, water and thickener together so as to form said formulation.

13. A composition comprising the constituents of a formulation as claimed in claim 1.

14. The composition as claimed in claim 13, characterized in that the calcium concentration is from 0.06 to 0.6% by weight.

15. A method of using the composition as claimed in claim 13 comprising applying the composition as a foliar fertilizer.

16. A method of using the composition as claimed in claim 13 for the treatment of tomatoes comprising applying the composition to tomatoes.

* * * * *